Dec. 13, 1960

H. P. RAABE 2,963,940

MICROFILM VIEWING AND STORAGE APPARATUS

Filed March 21, 1956

3 Sheets-Sheet 1

INVENTOR.
HERBERT P. RAABE

BY

Jerome P. Bloom

HIS ATTORNEY

Dec. 13, 1960 H. P. RAABE 2,963,940

MICROFILM VIEWING AND STORAGE APPARATUS

Filed March 21, 1956 3 Sheets-Sheet 2

INVENTOR.
HERBERT P. RAABE
BY
Jerome P. Bloom
HIS ATTORNEY

Dec. 13, 1960

H. P. RAABE 2,963,940

MICROFILM VIEWING AND STORAGE APPARATUS

Filed March 21, 1956

3 Sheets-Sheet 3

INVENTOR.
HERBERT P. RAABE
BY
Jerome P. Bloom
HIS ATTORNEY 2,963,940
Patented Dec. 13, 1960

2,963,940

MICROFILM VIEWING AND STORAGE APPARATUS

Herbert P. Raabe, Dayton, Ohio
(7 Thompson Lane, North Oaks, St. Paul 10, Minn.)

Filed Mar. 21, 1956, Ser. No. 572,929
23 Claims. (Cl. 88—24)

This invention relates to microfilm viewing and storage apparatus. It particularly provides a compact portable viewer of an improved nature that accommodates a novel microfilm cartridge which serves as a permanent sealed receptacle for the microfilm therein. A feature of this cartridge is that it includes means providing for mechanical coding thereof to identify the microfilm therein, adapting it to be mechanically applied to a novel storage unit. This aspect of the invention enables a foolproof filing system to be effected in the use of the cartridge provided.

The use of microfilm has become quite extensive in recent years. However, its free use has been limited by the physical problems presented in the viewing and library storage thereof with the facilities available. Microfilm viewers, for example, have had a tendency to be of some bulk and are fairly costly in nature. As a result, they are generally available only in fixed locations which have library type facilities. And they have not been of a particularly portable nature, making it difficult to use them under the best conditions and in the most efficient manner. In applying microfilm in the viewers of the prior art it is extremely difficult to avoid handling the film. This is the occasion of much damage and soiling of the film emulsion which can even render the film worthless or at least cause deterioration of the clarity of the recorded material.

A further problem in addition to personal handling effects on the film is that dust or dirt formation on film in storage or use can have similar damaging effects. The previously available storage devices for microfilm leave much to be desired. They do not protect the film as required. And, due to the size of the microfilm, difficulty has been occasioned in providing catalogued storage facilities which would make a particular film immediately accessible. Microfilm contents can often times be of great value and improper filing has many times resulted in the film being misplaced or lost.

The apparatus and system for storage and viewing of microfilm as provided by the invention affords the solution to all the problems above enumerated as occurring in the prior art. The invention provides an exceedingly compact and portable microfilm viewer. It also affords a novel sealed microfilm cartridge for the viewer which may serve as a permanent receptacle for the roll of film therein. The cartridge is completely dust free and seals the microfilm therein until it is automatically released by insertion in the viewer. And the viewer will not provide for release of the microfilm until the cartridge is positively sealed therein. No handling of the microfilm is necessary in the process. And the cartridge provides for mechanical coding thereof for foolproof storage in mechanical fashion in a simple efficient receptacle device which insures its availability at all times. The storage facilities so provided are of a compact and inexpensive nature and they prevent the storage of a cartridge except in a single receptacle which is mechanically adapted to receive only this single cartridge.

The above features and advantages of the invention enumerated are merely by way of example. Many other advantages and features of the invention will be readily apparent from the description of an embodiment thereof herein.

An object of the invention is to provide a novel system and apparatus for the viewing and storage of microfilm.

Another object of the invention is to provide a compact and economical portable microfilm viewer.

A further object of the invention is to provide novel portable microfilm viewing apparatus accommodating an improved microfilm cartridge wherein means are provided to automatically engage and release the microfilm in the cartridge when the cartridge is locked in predetermined position therein.

An additional object of the invention is to provide an improved sealed microfilm cartridge which prevents the release of the microfilm therefrom until the cartridge is sealed in operative position in a viewer.

Another object of the invention is to provide an improved microfilm cartridge providing a permanent mechanically coded storage unit for the microfilm therein.

A further object of the invention is to provide improved storage apparatus for microfilm containers which is mechanically adapted to selectively accommodate a single mechanically coded microfilm container and no other.

Another object of the invention is to provide a novel cartridge receptacle enabling an improved identification system and apparatus for storing microfilm in catalogued fashion.

An additional object of the invention is to provide an improved microfilm viewer having safety means preventing operation thereof until the microfilm is introduced in predetermined relation thereto and preventing removal of the microfilm therein until it is returned to its storage condition.

Another object of the invention is to provide improved apparatus for the viewing and storage of microfilm having the advantageous structural features, the inherent meritorious characteristics, and the mode of operation and use herein described.

With these primary and other incidental objects in view as will more fully appear in the specification, the invention intended to be protected by Letters Patent consists of the features and construction, the parts and combinations thereof, and the mode of operation and use as hereinafter described or illustrated in the accompanying drawings, or their equivalents.

Referring to the drawings wherein is found the preferred, but obviously not necessarily the only form of embodiment of the invention, Fig. 1 is a partial side elevation of the compact portable viewer of the invention.

Figure 3:
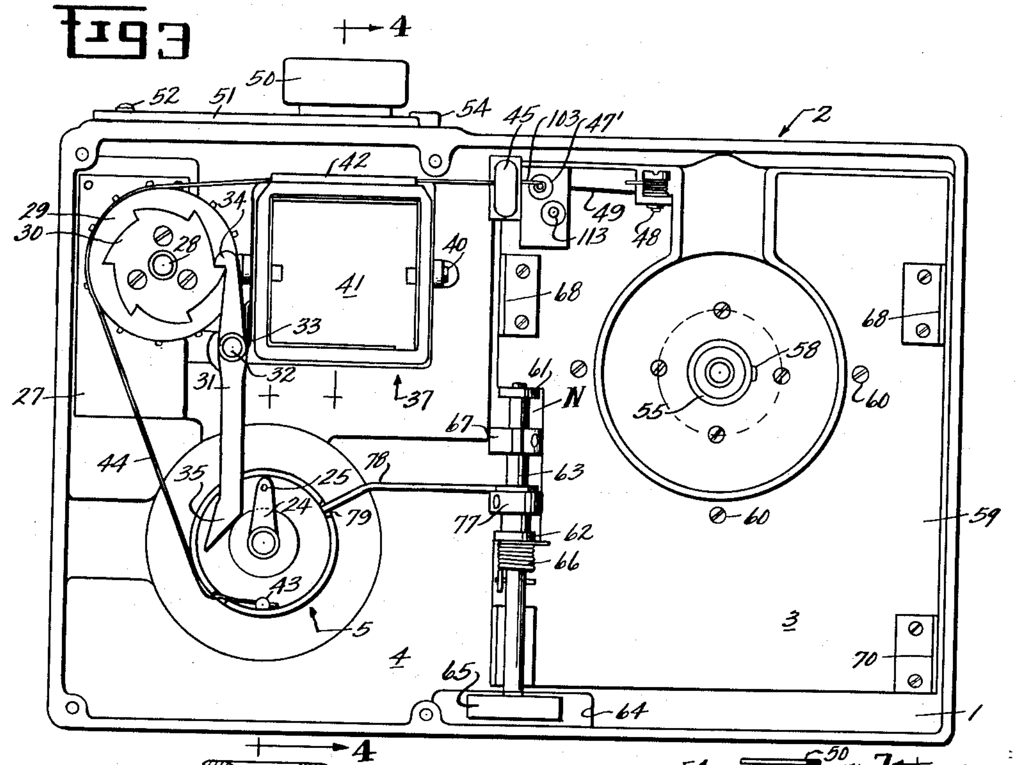
Fig. 3 is a longitudinal vertical side view of the viewer of Fig. 1 with the cover plate and details of the cartridge accommodating apparatus thereof removed for clarity of disclosure.
Figures 1, 2, 4:
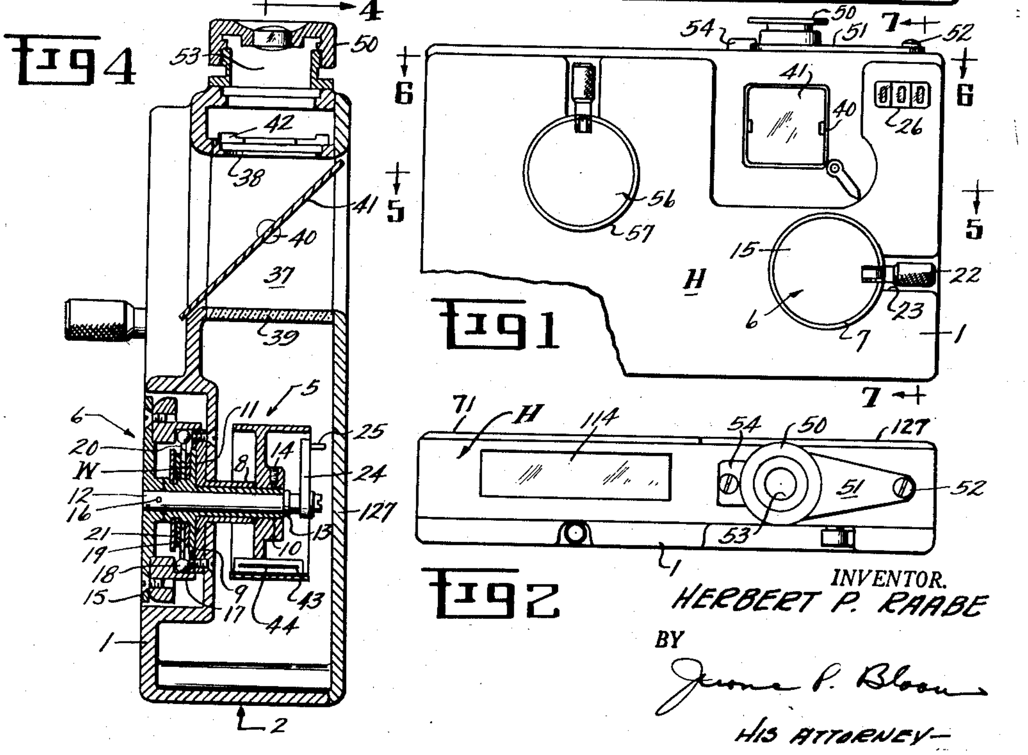
Fig. 2 is a top view of the viewer as shown in Fig. 1.
Fig. 4 is a cross-sectional view taken on line 4—4 of Fig. 3.

The invention can best be described with reference to the accompanying drawings. As shown in Figs. 1–4 thereof, the microfilm viewer includes a housing H comprising a rectangular side plate 1 which is vertically disposed and provided with a narrow flange about the periphery thereof and integral therewith to afford a receptacle 2 thereby. The receptacle 2 provides a cartridge receiving section 3 to one side thereof and a viewer section 4 to the other side thereof. The housing seats on the narrow flange base provided by the receptacle 2 and the open side thereof is closed by cover plates in a manner to be described. A film take up spool 5 is mounted centrally of the viewer section 4 of the receptacle. A drive assembly 6 for the spool 5 is mounted to the wall 1 of the receptacle in a circularly recessed portion 7 in the outer face thereof. The recessed portion 7 is centrally apertured to receive a cylindrical bearing 8 of the drive assembly 6 therethrough. The bearing 8 has an external flange 9 at one end thereof which is fixed by screws in abutting relation to the outer surface of the wall 1 in the recessed portion 7 thereof. The drive assembly includes a second cylindrical bearing 10 rotatably mounted within the bearing 8 and having its respective ends extending therefrom. The bearing 10 is provided with an external flange 11 adjacent the outer end thereof which seats in a recess in the outer face of flange 9 in bearing relation thereto. It is noted that the outer end of bearing 10 is short of the outer face of the wall 1 of the receptacle 2. A spindle 12 mounts in and extends through the bearing 10 and is provided with an external flange 13 adjacent its inner end in abutment with the inner end of bearing 10. The take up spool 5 mounts about the inner end of bearing 10 with its inner face abutting the inner end of the fixed bearing 8. The spool 5 is fixed to bearing 10 by a set screw 14 engaged through the hub thereof. A circular plate 15 is mounted on the outer end of the spindle 12 so as to lie in the plane of the wall 1 and have its hub extend inwardly on the spindle 12 to abut the outer end of the bearing 10. The plate 15 is fixed to spindle 12 by a pin 16 through the hub thereof. A cylindrical element 17 fixed by screws to the inner face of the plate 15 projects inwardly of the recess 7 to mount to and about the periphery of the flange 9 to provide a clutch housing thereby. The inner surface of the element 17 is stepped adjacent the outer face of the flange 9 to accommodate ball elements 18 between the shoulder provided thereby and the outer face of the flange 9. A retainer ring 19 is seated to and about the bearing 10 adjacent the outer end thereof. A one way ratchet wheel 20 is mounted about the bearing 10 with the inner face thereof abutting a leather washer W interposed between it and the flange 11. And a spring washer 21 is mounted between the retainer ring 19 and the outer face of the ratchet wheel 20 to bias the ratchet wheel in frictional engagement to the flange 11 of the bearing 10 through the leather washer W. The ratchet wheel 20 is so disposed that the ball elements 18 normally lie between successive teeth thereof.

A control arm 22 is pivotally connected to the plate 15 in a notch in the periphery thereof and when not in use is adapted to be disposed in a recess 23 in the receptacle wall 1 adjacent the recess 7 therein.

The drive assembly 6 is thus effected. To drive the take up spool 5, the arm 22 is pivoted to a right angle position relative the plate 15 for rotation thereof. The cylinder 17 rotates with the plate 15 and affords a clutch housing therewith which drives the bearings 18 up on successive teeth of the ratchet wheel 20 to effect a frictional coupling of the cylinder 17 to the ratchet wheel thereby to drive the bearing 10 therethrough and, accordingly, the take up spool 5. In the event the plate 15 and the connected cylinder 17 are rotated in the opposite direction, the bearings 18 will drop into the deepest portions between the ratchet teeth and the cylinder and plate 15 constituting the clutch housing will free wheel. A one way drive is thus effected for the take up spool.

An arm 24 is fixed to the inner end of the spindle 12 beyond the inner end of bearing 10 so as to extend radially therefrom. A pin 25 is fixed in the outer end of arm 24 at right angles thereto so as to project outwardly of the face of the spool 5 for purposes to be described.

In the extreme upper corner of the receptacle, in the viewer section thereof, is mounted a frame counter unit 26. This unit 26 is generally shown and will not be described since it forms no part of the present invention. A cover plate 27 is fixed to the wall 1 of the receptacle in spaced relation thereto providing a back plate for unit 26.

A spindle 28 is fixed to the cover plate 27 to extend parallel to the spindle 12 of the take up spool. A ratchet plate 30 is fixed by screws to the outer face of an idler roller 29 which rotatably mounts on the spindle 28 in the plane of the spool 5. A control arm 31 is pivotally mounted to the receptacle wall adjacent the idler 29. The upper end of the control arm has a dog 34 integral therewith. A spring 33 anchored about the pivot pin 32 for arm 31 engages its free end to the upper end of the arm 31 to normally bias the dog 34 into engagement with the teeth of ratchet plate 30 to prevent advance of film by the spool 5. This causes the lower and longer end 35 of arm 31 to be biased into the path of the pin 25 on the control arm 24 fixed for rotation with the take up spool 5. When a frame of the film is in viewing position in the viewer, the pin 25 is adjacent the lower end 35 of arm 31 as seen in Fig. 3 of the drawings. To present a following frame to the view, as the spool 5 is driven, the pin 25 engages the arm 31 to pivot the dog 34 thereof out of engagement with the ratchet plate 30 on the idler 29. This permits the idler to turn and the film to be advanced by the spool 5. As the film is advanced, the pin 25 cams past the arm 31 and it pivots to bias its dog 34 into engagement with the ratchet plate 30 once more under the influence of spring 33. As a new frame is presented for viewing, the dog is engaged to a succeeding ratchet tooth preventing advance of the idler and the film until the idler is released by positive drive of spool 5. This enables intermittent viewing.

A rectangular aperture is provided in the wall 1 of the receptacle which is defined by a rectangular wall element 37 fixed to the wall 1 to extend transversely of the viewer housing. The upper section of the wall element is centrally apertured at 38 while the lower section thereof is provided in substantially spaced relation thereto by the depending side sections thereof. Pivoted to the opposed side sections of the wall element 37 by pivot pins 40 is a reflector plate 41 which has a white surface. The plate 41 is of a size that it extends diagonally of the side sections of the wall element 37 with its extremities engaging in abutting relation to the side plates of the housing H. Accordingly, the plate 41 may be pivoted through an angle defined by the upper and lower limits of the wall element 37 for selective reflection of light thereby through the upper section of the element 37 as will be described.

Seated on the upper surface of the wall element 37 over the aperture 38 therein, and fixed thereto by screws, is a film guide 42 having a film aperture therein. The upper surface of the guide 42 is grooved to receive and guide microfilm therein. And the aperture in the film guide is aligned with the aperture 38 in the wall element 37.

Fixed within the spool 5 is a clamp 43 in which one end of a film leader 44 is engaged. The leader 44 extends through a slot in the spool and up and around the idler 29, back through the groove in the film guide 42 and through film guide rollers 45 mounted to the wall 1 of the receptacle intermediate the viewer and the magazine receiving sections thereof. The leader 44 has a metal strip 103 on its outer end providing a loop mounting a coupling pin 104 parallel to the outer end thereof. In its loading condition the leader 44 extends into the magazine section of the viewer to dispose its loop and pin 104 to align with and be engaged by the outer end of a spring biased locator element 47 mounted in a bearing fixed to the wall 1. The inner end of element 47 is engaged by the outer end of a spring 49 to normally bias the element to engage the loop and fix the position of pin 104 in the magazine section for automatic engagement to the leader of a microfilm cartridge as will be described. The spring 49 has its inner end wrapped about a bolt 48 connected to a bracket fixed to the wall 1 adjacent the locator element 47.

It is noted that idler 29 has twelve sprocket teeth 29' spaced equidistantly thereabout to one side thereof to engage in the apertures along one edge of the film to control and guide it as it passes over the idler to the take up spool.

An arm 51, pivotally mounted to a pin 52 in the top of housing H at one end thereof, has an aperture 53 in its outer end defined by a cylindrical projection having a lens 50 threadedly engaged thereto. The arm 51 is adapted to be disposed on the housing H so the lens 50 seats over an aperture in the top of the housing in alignment with the aperture 38 in the wall element 37 therein. A clamp block 54 is fixed on the upper surface of the housing to have a projecting portion thereof engage over the outer end of arm 51 and fix the lens in its viewing position in releasable fashion.

The cartridge receiving section 3 of the receptacle 2 has a drive spindle 55 mounted centrally thereof. A one way drive assembly 56, identical in nature to the drive assembly 6 for the take up spool, seats in a circularly recessed portion 57 in the wall 1 to extend in the housing in driving engagement with the spindle 55. The spindle 55 mounts to the drive assembly 56 in a manner identical with the mounting of the take up spool 5 to the drive assembly 6. Accordingly, no further detailed description thereof appears necessary. The one way drive direction of the assembly 56, however, is opposite to that provided for drive by assembly 6. Therefore, the ratchet wheel in assembly 56 has its teeth in reversed direction. A spring 58 is fixed to the periphery of spindle 55, longitudinally thereof, so as to project radially therefrom.

A mounting plate 59 is mounted in spaced parallel relation to the wall 1 of receptacle 2 in the cartridge receiving section 3 thereof by screws 60. The plate 59 is apertured to mount about the inwardly projecting portion of the wall 1 effected by the recess 57. The plate 59 extends vertically of the housing H and one side is adjacent one end of the housing while the other defines the line of separation of the cartridge receiving section and the viewer section 4 thereof.

A bracket plate 70 is fixed adjacent each side of plate 59 at the lower extremity thereof. The plates 70 have right angled bases fixed to plate 59 by screws so they extend in aligned parallel relation and vertically of the housing H. A bracket plate 68 is similarly fixed at either side of the plate 59 adjacent the upper extremity thereof and in the plane of the respective lower bracket plates 70. The plates 68 are provided with aligned identical slots 69 vertically of the housing H.

A rectangular notch N is provided in the side of plate 59 defining the separation of the cartridge receiving and the viewing section of the receptacle 2. Perpendicularly projecting ears 61 and 62 are provided on the plate 59 at the upper and lower edges of the notch N. The ears 61 and 62 are vertically aligned in the housing and have vertically aligned apertures therein. The ears 61 and 62 serve to rotatably mount a shaft 63 which extends through the apertures therein from the upper ear through lower ear 62 to project through the bottom wall of the housing H into a recess 64 therein. A control head 65 is fixed by any suitable means to the outer end of the shaft 63 in the recess 64 so that rotation of the head 65 results in rotation of the shaft 63. The shaft 63 is spring loaded in a counter-clockwise direction, observing it from its outer end, by a coil spring 66 wrapped thereabout adjacent the ear 62 and respectively anchored to the ear 62 and the shaft 63.

A hook type latch member 67 is fixed to the shaft 63 intermediate the ears 61 and 62 to project radially of the shaft. Mounted to the shaft 63 intermediate the latch 67 and the ear 62 is a collar 77. The collar 77 has angled arm 78 fixed to one face thereof to project into the viewer section of the housing and normally have its outer end biased to a point adjacent a notch 79 in the periphery of the spool 5, to the rear thereof, under the influence of spring 66. The arm 78 serves a safety function as will be described. A cover plate 127 seats over the viewer section 4 of the receptacle 2 and is fixed to the receptacle by screws. It is noted the outer end of arm 78 aligns with notch 79 and may be swung therein only when leader 44 is extended.

A cover plate 71 is provided which is adapted to cover the cartridge receiving section 3 of the receptacle and thus seal the housing H. Disposed on the inner surface of the cover plate 71 adjacent the upper extremity thereof are bracket plates 68 identical in nature to those mounted to plate 59 in the housing and respectively aligned therewith. Similarly, bracket plates 70 are fixed to the lower extremity of the plate 71, to either side thereof and respectively in alignment with the respective outwardly projecting plates 70 mounted to plate 59 in the housing. The bracket plates 70 on the plate 59 are transversely connected by a pivot pin 73 and the plates 70 on the cover 71 are similarly connected by a pivot pin 73'. The lower end of an expander bar 72 is pivotally connected to each bracket plate 70 by means of the pivot pins 73 and 73'. This establishes a pair of expander bars 72 to either side of the cartridge receiving section 3 of the housing H offset to cross centrally thereof so the bars respectively dispose their upper ends to the inner sides of bracket plates 68 diagonally opposed to and aligned with the brackets 70 to which they connect. A pin 74 is fixed to each bar 72 at the upper end thereof which projects laterally into the slot 69 in the bracket plate 68 adjacent thereto for sliding adjustment vertically thereof. About the pivot pin 73' to either end thereof adjacent the respective brackets 70 is a coil spring 75 having one end engaged to the cover 71 and the other end engaged to the expander bar adjacent thereto. This effects a bias on the cover 71 to tend to project it from its sealing relation to the housing H.

Vertically arranged cartridge guide plates 76 are fixed to the inner surface of cover 71 in parallel fashion to project inwardly therefrom. The guide plates 76 have projecting flanges 80 at the lower ends thereof which are directed towards each other in the same plane. A loop extension 81 is provided on the guide plate 76 adjacent the viewer section of the housing. When the cover plate 71 is in its projected position from the housing H, the loop 81 projects toward the latch 67 on the shaft 63, and when the cover plate is moved to its sealing position to the receptacle, the loop 81 engages the latch to pivot it and the shaft 63 to have the latch engage thereto and latch the cover plate 71 to the housing as will be described in more detail herein.

A novel normally sealed microfilm cartridge 82 is employed in the cartridge receiving section 3 of the housing. The cartridge 82 has a flat rectangular shape and is preferably moulded of plastic. The cartridge comprises a shallow rectangular receptacle 83 formed to provide a central circularly recessed portion therein to accommodate a roll of microfilm M about a cylindrical spool 84. The spool 84 has an internal flange 86 adjacent the side outwardly of the receptacle 83 and slightly inwardly thereof.

A cylinder 87 is mounted centrally of the spool 84 in bearing relation to the internal flange 86 thereof. The inner end of the cylinder 87 adjacent the inner wall of receptacle 83 has a circular plate 88 integral therewith and extending radially therefrom in bearing relation to the inner wall of the spool 84 in an axial sense and keyed thereto. A membrane spring 89 provided between the cylinder plate 88 and the back wall of the receptacle normally biases the cylinder 87 outwardly of the receptacle. The spring 89 is formed to provide contact with the receptacle wall only at a point centrally thereof. The outer end of cylinder 87 is conically reduced. A cover 91, formed similarly to the receptacle 83, is sealingly connected thereto by screws 92. The cover has a central aperture 93 which aligns with the cylinder 87. The aperture at the outer face of cover 91 has a smaller diameter than the external diameter of cylinder 87 and it expands conically to the inner face of the cover in a manner complementary to the conical end 90 of cylinder. Thus, as the cover is applied, its apertured portion seats in sealing relation about the conical end of the cylinder which is normally biased thereto by spring 89. It is noted that the cylinder 87 is internally splined.

The similarly formed receptacle 83 and cover 91 jointly afford a sealed cartridge having relatively narrow opposite sides 94 and 95 which have slide projections 96 formed longitudinally and centrally thereof. Projections 96 are formed to be pointed adjacent the base of the cartridge, expanding upwardly symmetrically, then continuing at a uniform width to points spaced from the top 98 of the cartridge where they expand to the width of its sides. Spaced slightly from the top of the cartridge, the sides 94 and 95 are provided with a groove 99 transversely thereof. The side 95 has a second groove 100 transversely thereof at an intermediate location. The groove 99 in the side 95 of the cartridge has a film slot 101 therein providing the only communication with the interior of the assembled cartridge.

The receptacle 83 has a film guide 102 formed therein to the back wall thereof adjacent the film slot 101. The leader 46 of the microfilm in the cartridge is adapted to be led from the spool over the guide 102 and be threaded through the film slot 101. The leader 46 has a metal binder at its outer end mounting a coupling eyelet 46' to project forwardly thereof. This insures that the leader will not slip back into the cartridge once the cartridge is sealed.

The receptacle 83 is provided with a formed plate 105 parallel to the side 95 thereof adjacent the film slot 101. The plate 105 has a projection at the base thereof toward the side 95. A latch plate 106 is mounted in the receptacle in sliding relation to the plate 105 and the side 95 of the cartridge adjacent the slot 101 therein. The latch 106 is formed with a shoulder opposed to the projection on plate 105 and a spring 107 is interposed therebetween to bias the latch 106 upwardly of the cartridge. The upper end of the latch 106 has a small projection 108 at one side adapted to normally engage in an aperture in the edge of the film under the influence of the spring 107. The film being engaged at the slot 101 is thereby biased upwardly, the latch 106 overlying the slot 101 in the process and sealing the cartridge until released. The latch 106 lies in a section of the cartridge sealed off from the film M. An aperture is provided in the back wall of the receptacle into this sealed section to permit entrance of a pin to engage in a camming slot 108 in the latch plate 106 to release the microfilm, as will be described.

The top surface 98 of the cartridge has a rectangular recess 109 therein, the sides of which are undercut affording a secure application of a label to the cartridge to identify the contents thereof. The base 110 of the cartridge accommodates a thin metal code plate 111 seated in recessed fashion therein with its perimeter mounted in a continuous slot provided in the walls of the cartridge at the base thereof. An inner wall 112 is formed in the receptacle 83 to seal the film section of the cartridge from the plate 111 in the assembled condition thereof. The plate 111 is marked by parallel lines arranged laterally and longitudinally thereof in predetermined spaced relation, the intersections thereof representing code points of the plate. By aperturing the plate at selected intersections in accordance with a predetermined library code, the subject matter of the film in the cartridge can be specifically identified in a mechanical fashion and it will correspond to the label on the top of the cartridge. This enables a permanent microfilm cartridge affording a novel cataloguing and storage of microfilm as well as an efficient hermetically sealed dust free unit which may be applied to a viewer and automatically and operatively coupled thereto.

Figures 5, 6, 7, 8, 9:
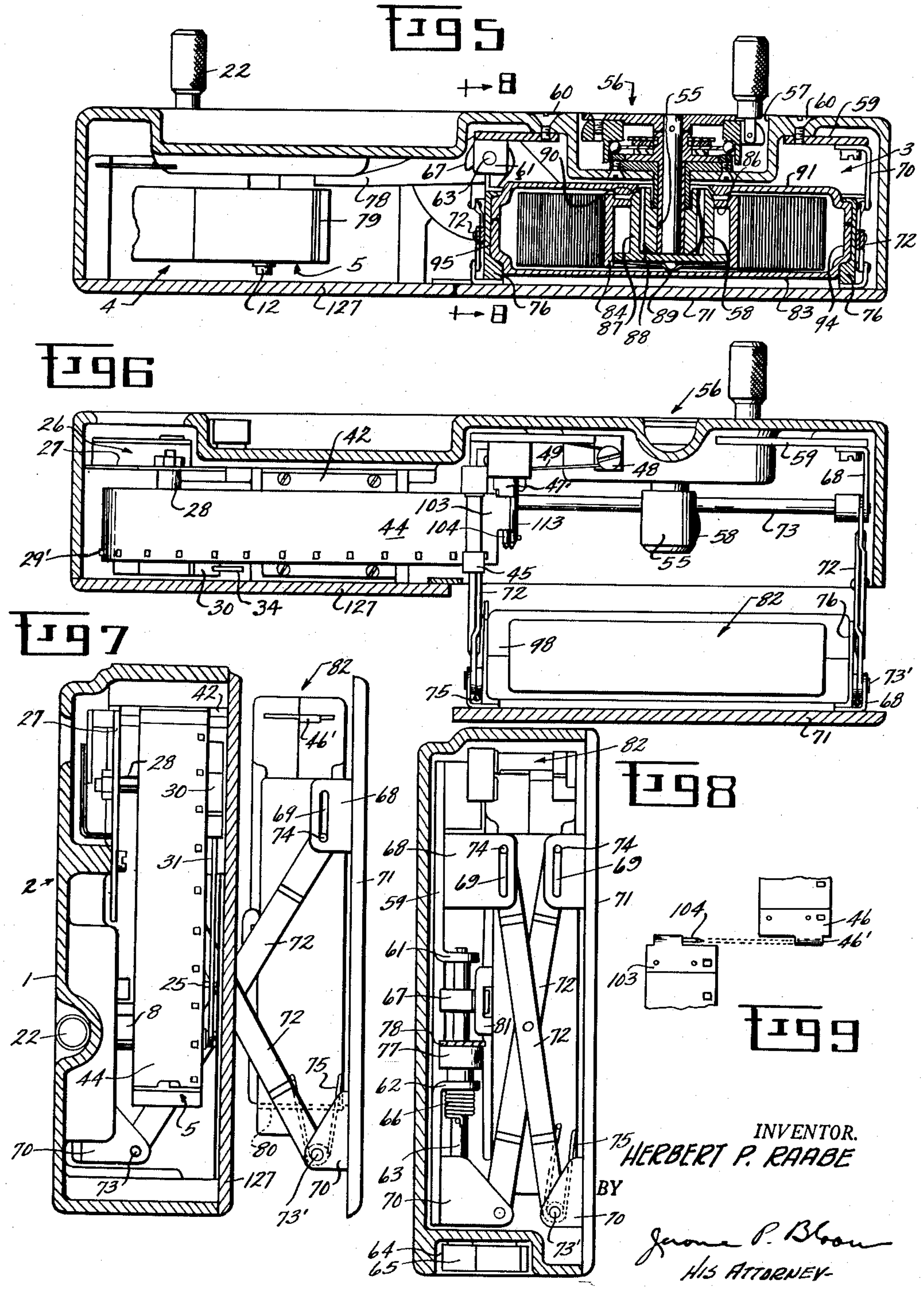
Fig. 5 is a horizontal section of the viewer of Fig. 1 taken along line 5—5 thereof and showing the accommodation of the microfilm cartridge therein.
Fig. 6 is a horizontal section of the viewer of Fig. 1 taken along line 6—6 thereof and showing the cartridge accommodating apparatus thereof in a projected position.
Fig. 7 is a vertical cross-section of the viewer taken on line 7—7 of Fig. 1 and showing the cartridge accommodating apparatus in extended position.
Fig. 8 is a vertical cross-section of the viewer taken on line 8—8 of Fig. 5.
Fig. 9 is a fragmentary detail view showing the automatic connection of the microfilm in the cartridge to the leader in the viewer as the cartridge is applied.

An embodiment of the compact portable viewer and improved sealed microfilm cartridge employed therewith having been thus described, the use thereof and the automatic cooperation therebetween occurs as follows. Noting Fig. 6 of the drawings, for insertion of a cartridge 82 containing a specific film in the unloaded viewer housing H, the control head 65 is turned to rotate the shaft 63 against the bias of spring 66. With the housing H in its unloaded condition, the leader 44 on the take up spool 5 is fully extended with its coupling loop 103 engaged by the element 47 in the cartridge receiving section 3 of the housing. At this point the notch 79 is uncovered and aligned with the outer end of arm 78. Thus, as the shaft 63 is turned against its spring bias, the end of arm 78 is accommodated as it swings and is received in the notch 79 to permit the shaft 63 to be rotated sufficiently to disengage the latch 67 from the loop 81 projecting from the cartridge guide plate 76 on the cover 71 for the cartridge receiving section 3 of the housing. The cover plate 71 being thus released is biased out from the housing H under the influence of springs 75. The expander bars are then in their expanded condition disposing the cover 71 and the cartridge receiving guide plates 76 clear of the housing. The cartridge 82 is then inserted base first into the guide plates 76 and slid therein to have the cartridge base seat on the flanges 80. The cartridge being thus established in a predetermined position to the cover 71, it is introduced into the viewer housing by pushing the cover 71 inwardly against the bias of springs 75. It is noted that on release of the control head 65 as the cover 71 was projected that the spring 66 biased the shaft 63 back to its normal position, disposing the hook portion of latch 67 in the line of the loop 81. Accordingly, as the cover 71 moves to its sealing relation to the housing, the loop 81 engages and cams the latch 67 against the bias of the spring 66. Also, a pin 113, mounted to project perpendicularly from plate 59 in the receptacle 2, begins to enter the aperture in the cartridge in communication with the latch plate 106 therein. Simultaneously, the drive spindle 55 in the receptacle engages in the splined internal surface of the cylinder 87 to couple thereby to the film spool 84.

As the cartridge finally seats in sealing relation to the housing, the following action takes place. The spindle 55 seats in the cartridge, engaging the back plate 88 to drive the cylinder 87 inwardly of the cartridge against the bias of spring 89. This frees the frictional connection of the film spool to the cartridge and enables it to be freely rotated. The loop 81 cams past the hook portion of the latch 67 and the bias of spring 66 causes the latch to immediately reverse and engage through the loop 81 and latch the cover 71 and the cartridge mounted thereto in predetermined position to the housing H. As this occurs, the pin 104 on the projecting end of the take up leader 44 is coupled in the aligned eyelet 46' on the projecting end of the microfilm in the cartridge. And, simultaneously, the cartridge engages a projecting collar 47' on the locator element 47, causing its withdrawal from the loop mounting the pin 104 and release of the leader 44 thereby. And, finally, the pin 113 engages in slot 108 of latch plate 106 to cam the latch plate and disengage it from the film and from its sealing relation to the film slot 101 thereby against the bias of spring 107. The entire operational coupling and safety release action occurring on closing the cover 71 is completely automatic. The film is not handled and it is maintained in a sealed condition until the cover 71 is latched to seal the housing H. And during loading the spool 5 cannot be operated due to the engagement of the leader 44 by locator element 47.

The one way clutch afforded by the drive assembly 6 insures that the spool 5 can be only driven in a direction to draw microfilm from the cartridge. For viewing, the spool 5 is driven and its leader 44 is taken up about its periphery and over notch 79. This prevents rotation of arm 78 and thereby of shaft 63 so that the cover 71 cannot be released until the film is completely returned to its stored condition in the cartridge 82, at which time the leader 44 is extended to uncover notch 79. As the first frame of the microfilm is drawn over the film guide 42 in the viewer section 4 of the housing, the dog 34 on the control arm 31 engages a tooth on the ratchet plate 30 of the idler 29 as it registers with the viewer lens 50. Noting Fig. 3 of the drawings, light is projected laterally of the housing through the aperture therein defined by wall element 37 to be reflected from the surface of reflector plate 41 and through the guide plate 42 to illuminate the film for clear viewing. As can be seen, the plate 41 can be pivoted to receive light from either side of the housing. As the spool 5 is actuated to present a succeeding frame to the viewer lens, the control pin 25 engages the arm 31 to pivot it out of engagement with the idler ratchet 30 to free the roller 29 and permit free advance of the next frame into registration. The pin 25 cams past the arm 31 and the bias of the spring 33 adapts it to engage the next tooth on the ratchet plate 30 as it is presented on registration of the succeeding frame. As will be readily seen therefrom, the viewer adapts itself easily for the intermittent viewing or the skip viewing and the film registration is precisely provided for.

When the film is to be rewound and the cartridge removed, the one way drive assembly 56 is actuated to draw the microfilm back into the cartridge by rotation of the spool 84 through the spindle 55 and the cylinder 87. When the film is completely returned, the pin 104 on the viewer leader 44 is once more automatically aligned with the spring biased locator 47 in the cartridge receiving section of the housing and the leader being unwound from the spool 5, the notch 79 therein is now open. It will be noted the cartridge is sealed at all times until it is sealed in the housing wherein it is safe from dust and damage. The door 71 on the housing is released by rotating control head 65 to rotate the latch 67 to disengage the loop 81 from the latch and free the cover plate 71 which is projected outwardly of the housing H under the influence of the biasing springs 75. As the notch 79 in the spool 5 is open, the arm 78 was biased therein permitting this operation. The loop 46' on the microfilm leader 46 slides free of the pin 104 which is held by locator 47 as the cartridge moves out with the cover 71. Also, the pin 113 disengages from the latch plate 106 in the process, allowing it to be biased into latching engagement to the film to seal the slot 101 in the cartridge. And once more the cartridge is completely sealed without hands being applied as the cover 71 is released. It is ready for mechanical storage in a foolproof fashion upon removal from the viewer to serve as a permanent receptacle for its identified contents, labelled both by a seated label in the top thereof and by the mechanical code on the bottom. It is noted that a window 114 is provided in the top of housing H so the cartridge label may be seen therethrough when the viewer is loaded.

Figures 10, 11, 12, 14, 15, 16:
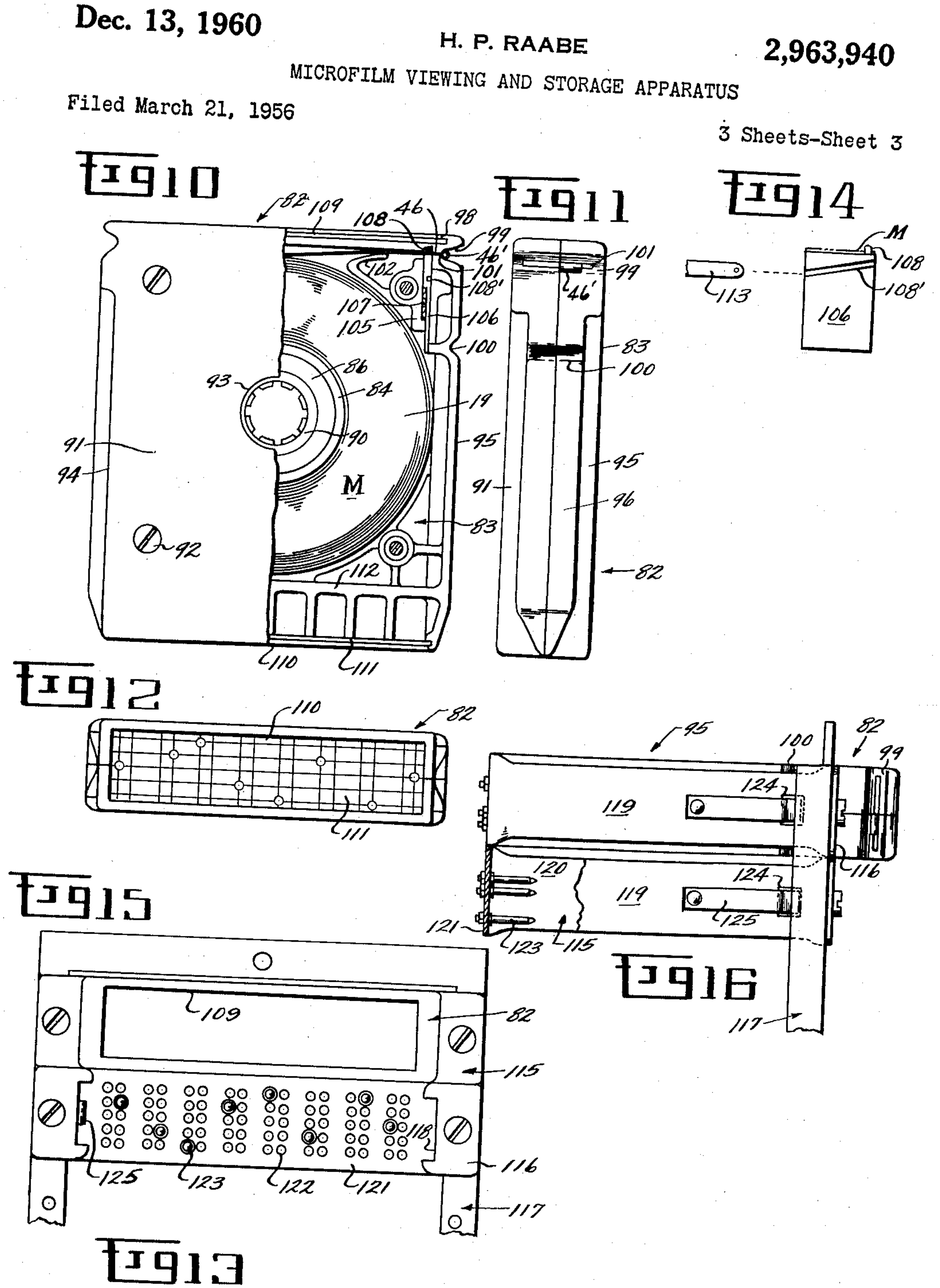
Fig. 10 is a side elevation of the novel cartridge of the invention with the cover plate broken away for showing details thereof.
Fig. 11 is a side elevation of the cartridge of Fig. 10.
Fig. 12 is a bottom view of the cartridge of Fig. 10.
Fig. 14 is a fragmentary detail view in schematic fashion showing the microfilm release from the cartridge on its application to the viewer.
Fig. 15 is a front view of the mechanically coded storage receptacle provided for the cartridge of Fig. 10.
Fig. 16 is a side view of the apparatus of Fig. 15 with the receptacle device partially broken away for showing detail thereof.
Figure 13:
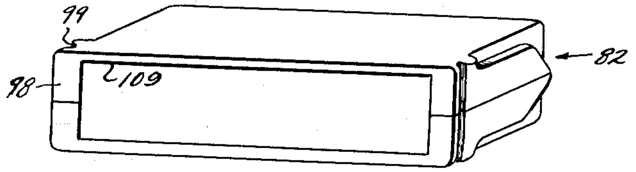
Fig. 13 is a top perspective view of the cartridge of Fig. 10.

Improved storage facilities are provided and enabled by the novel cartridge 82 as shown in Figs. 15 and 16 of the drawings. The cartridge receptacle 115 employed for catalogued storage thereof is in the form of a rectangular U-shape having flanges 116 integral with the outer ends thereof and projecting outwardly therefrom in the same plane. These flanges 116 are apertured and adapt the receptacle 115 to be secured thereby to the side bars of a vertical and rectangular framework 117 to stack in horizontal relation therein. The stacked relation of the receptacles 115 to the framework 117 is shown in the drawings. Each receptacle 115 has guide grooves 118 in the inner surfaces of the parallel side members 119 and 120 thereof. These guide grooves are shaped to accommodate the slide projections 96 on the cartridges 82 in sliding relation thereto. The rear and connecting portion 121 of the receptacle 115 has apertures 122 therein arranged in the pattern of the points in the base plate 111 of the cartridges. Removable pins 123 are removably secured in selected apertures 122 to project inwardly of the receptacle 115. The pins 123 are in accordance with a specific code and no two receptacles can identify more than a single cartridge nor mechanically adapt to receive other than the similarly coded cartridge having its base plate 111 specifically apertured to accommodate the pins 123 therein. The number of combinations available in the code as provided are innumerable and afford a complete catalogue identification system for microfilm cartridges. A leaf spring 125 is pinned to one side member 119 of the receptacle to have its outer end adjacent the outer end of the receptacle and biased through an aperture 124 therein. A cartridge is simply horizontally inserted in the receptacle, base first, the slide projections 96 thereof sliding in the grooves 118 in the side members of the receptacle and if the proper cartridge is being inserted, the base plate thereof will be engaged by the pins 123 and it will seat, the detent on the outer end of spring 125 engaging in the groove 100 in the side of the cartridge and latching it in the receptacle with its outer end having the label thereon projecting slightly therefrom. Of course, an improper cartridge can never be seated and there can be no misfiling in the cartridge storage system thus provided. A cartridge can be quickly located and removed for use by merely inserting it in the viewer which may be easily carried for use to any location.

The simplicity and economy effected by the components of the subject invention and the efficiency and utility effected in the use thereof affords a distinct advance in the art. The viewing and storage of microfilm may be effected in any location and maximum protection is afforded for the microfilm against damage and loss in the process.

The invention embodiment illustrated herein has been particularly described with reference to its use as microfilm viewing apparatus. However, it will be readily apparent therefrom that the novel viewer apparatus provided may equally serve as a camera assembly for recording purposes, merely requiring application of a shutter adapter thereto in such instance.

From the above description it will be readily apparent that there is thus provided a device of the character described possessing the particular features of advantage before enumerated as desirable, but which obviously is capable of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific feature shown, but that the means and construction herein comprise the preferred form of several modes of putting the invention into effect, and the invention is therefore claimed in any of its forms or modifications within the legitimate and valid scope of the appended claims.

Having thus described my invention, I claim:

1. Microfilm viewing apparatus comprising, a thin rectangular housing having a section biased to be displaced outwardly therefrom, a microfilm cartridge holder mounted to said biased section having a thin rectangular cartridge mounting a roll of microfilm therein and a mounting element therefor, a film slot in the cartridge, the lead end of the film projecting through said film slot and having a coupling element connected thereto, means in said cartridge normally engaging the film to prevent its withdrawal and sealing said film slot in the process, a latch means on said holder, a coupling spindle in said housing adapted to engage in said cartridge to said microfilm mounting element as said section is closed to said housing, film take up means in said housing having a leader with a coupling element releasably disposed in the path of said film coupling element to automatically couple thereto, means in said housing adapted to disengage said film engaging means in said cartridge to free the film for withdrawal by said take up means, light transmitting means in said housing intermediate said spindle and take up means providing a viewing stage and guide for the film, a second latch means in said housing automatically engaging said holder latch means as said section is closed, and means connected with said second latch means and operatively related to said take up means preventing projection of said section until the microfilm is completely returned to said cartridge, and a lens in said housing in viewing relation to the film.

2. Microfilm viewing apparatus, including a housing having a separable side section, expansible means connecting said side section to said housing and biasing it to project therefrom, means mounting a microfilm cartridge to the inner surface of said side section, means mounting a roll of microfilm in said cartridge, said cartridge having an access to said microfilm mounting means through one side, a film slot in said cartridge, the lead end of the microfilm projecting through said slot and having a projecting coupling element thereon, latch means on said side section, a spindle in said housing engaging through said access to the microfilm mounting means as said side section is sealed to said housing against the bias thereon to mount the microfilm thereon, film take up means in said housing having a coupling leader for disposal in the path of said film coupling element to automatically couple thereto as said side section seats to said housing, light transmitting means in said housing intermediate said spindle and take up means providing a viewing stage and guide for the film, a lens in said housing in viewing relation to said light transmitting means, intermittent control means in said housing for selective film advance by said take up means, a second latch means in said housing automatically engaging said section latch means as said section is closed, each of said spindle and film take up means having a one way drive operable in opposed directions whereby on operation of said takeup means said film may be advanced in stepped fashion for viewing and on operation of said spindle said film may be retracted into said cartridge.

3. In combination, a housing, a spindle and a take up spool mounted in spaced relation therein, a film guide mounted therebetween, a lens on said housing in viewing relation to said film guide, locator means adjacent said spindle, a leader connected to said spool to extend over said guide to be engaged by said locator means in the unloaded condition thereof, a cover element on said housing biased to be displaced therefrom, means releasably latching said cover element to said housing, cartridge accommodating means on said cover receiving a sealed microfilm cartridge therein on displacement of said cover element by release of said latch means, said cartridge having a roll of microfilm mounted therein on mounting means and providing a normally sealed access thereto at one side thereof and means for identification on the top thereof, said spindle engaging through said access to mount the roll of microfilm as said cover element is closed, the lead end of the film projecting through a film slot in said cartridge and providing a coupling means externally thereof which automatically couples to said leader and disengages said locator means as said cover element is closed, means in said cartridge normally engaging said film therein and sealing said film slot, a pin in said housing adapted to engage said engaging sealing means through access in said cartridge as said cover element is closed to release the film for withdrawal by operation of said take up spool, and a window in the top of said housing for viewing said cartridge identification means.

4. A microfilm cartridge providing a permanent shell for microfilm comprising, a receptable element having a circularly recessed section formed therein open to one side, a film spool in said recessed section mounting a roll of microfilm thereon, a cover sealingly applied to said shell element to close said one side having an aperture aligned with the spool, a coupling element concentrically connected to said spool and normally biased therefrom to seal the aperture, a film slot in said shell element receiving the film lead therethrough, the lead having a coupling element thereon, and means mounted in said shell in biased locking relation to the film to seal the film slot having means accessible through the wall of the cover to effect release thereof.

5. A hermetically sealed microfilm cartridge comprising, a sealed housing freely mounting a film spool therein having a roll of microfilm thereabout, an aperture in said housing open to the interior of said spool, a cylindrical element coupled to said spool for movement axially thereof and having means radially thereof in sealing bearing relation to the inner surface of said spool, said cylindrical element having means for coupling the film spool to a supply spindle, biasing means engaged between the housing and said cylindrical element to bias one end of said element to normally frictionally engage the housing about the aperture, a film slot in said housing providing the only communication with its interior and having the lead end of the film projecting therethrough and a coupling element on the lead of the film immediately exterior thereof, and releasable means in said housing normally engaging the film to seal the film slot preventing inadvertent film movement.

6. A hermetically sealed microfilm cartridge comprising, a sealed housing, a film spool freely mounting in a recessed portion therein having a roll of microfilm thereabout, an aperture in said housing open to the interior of said spool, a cylindrical coupling element coupled to said spool for movement axially thereof and having means radially thereof in sealing bearing relation to the inner surface of said spool, biasing means engaged between the housing and said cylindrical element to bias one end of said element to normally seal the element about the aperture in the housing, a film slot in said housing, the lead end of the film extending through the film slot and having a coupling means thereon normally overlying said film slot, slide projections on opposed sides of the housing including the side having the film slot, a recess in the top of the housing affording seating of a contents label thereto, and said housing having portions thereof selectively removable in accordance with a predetermined code identifying its contents whereby the unit can be selectively coupled in a viewer or a coded storage receptacle, in a mechanical fashion.

7. A microfilm cartridge serving as a permanent receptacle for the microfilm therein comprising, a sealed housing of a rectangular nature accommodating a roll of microfilm for rotation therein having coupling means internally of the roll of microfilm for seating the film to a spindle in a viewer as the cartridge is applied thereto, a slot in said housing for threading the film therethrough, the film having a coupling member normally overlying the film slot preventing its slipping into the housing, slide means on opposite sides of the housing, means on the top of the housing for identifying the contents thereof in storage or in a viewer, and plate means on said housing selectively apertured in coded fashion to mechanically identify the contents of the cartridge whereby to adapt it mechanically for coupling in a storage receptacle or in a viewer.

8. Microfilm viewing apparatus, comprising a housing of a thin rectangular nature having a viewer section and a cartridge receiving section, a take up bobbin in said viewer section, a rewind spindle in said cartridge receiving section, means defining an aperture transversely of said housing in said viewer section intermediate said bobbin and said spindle, said means defining an aperture having light transmitting means therein and providing a film guide thereon receptive to transmission of light rays therethrough, a lens mounted to said housing in viewing relation to said film guide, said housing having a side portion of said cartridge receiving section projectable relative thereto, a microfilm carrier mounted to said projectable portion of said housing to accommodate a roll of microfilm to mount to said rewind spindle on seating said relatively projectable portion to said housing and means connected to said bobbin for coupling to the microfilm in the viewer section.

9. Microfilm viewing apparatus, comprising a receptacle having a viewer section and a cartridge receiving section, a take up bobbin rotatably mounted in said viewer section, a supply spindle rotatably mounted in said cartridge receiving section, film guide means in said receptacle between said spindle and said bobbin of a light transmitting nature, means operatively connected to said guide means providing for reflection of light therethrough, a lens mounted to said housing in viewing relation to said film guide means, locator means in said cartridge receiving section, a film leader connected to said bobbin extendable over said film guide means to have its outermost end engaged by said locator means, said receptacle having a separable cover section opposite said spindle connected thereto and biased for displacement outwardly therefrom, microfilm cartridge containing means on the inner side of said separable cover section adapted to automatically mount a cartridge of microfilm to said spindle on seating of said cover section to said receptacle against the bias thereon, said film leader being disengageable from said locator means by coupling the microfilm thereto.

10. Microfilm viewing apparatus, including a receptacle having a viewer section and a cartridge receiving section, a take up bobbin mounted in said viewer section for drive thereof only in a take up direction, a supply spindle mounted in said cartridge receiving section for drive thereof only in a direction opposite to the drive of said bobbin, film guide means in said receptacle between said spindle and said bobbin, means connected to said film guide means for transmission of light therethrough, a lens mounted to said receptacle in viewing relation to said film guide means, a film leader connected to said bobbin extendable over said film guide into said cartridge receiving section, means for releasably engaging said film leader in said cartridge receiving section to facilitate coupling microfilm thereto, said receptacle including a releasable cover plate for said cartridge receiving section, a microfilm carrier on the inner side of said releasable cover plate for automatically mounting a cartridge of microfilm to said spindle on seating of said plate to cover the cartridge receiving section of said receptacle, means for automatically latching said cover plate on seating thereof and means connected with said latching means preventing release of said cover plate unless the film leader is extended into said cartridge receiving section free of said bobbin.

11. Microfilm viewing apparatus, comprising a thin rectangular housing, a film take up spool therein having a one way drive, a film supply spindle therein having a one way drive, a film guide means intermediate said spool and said spindle, a viewer lens on said housing in viewing relation to said guide means, said housing having an opening in one side opposite said spindle, a plate adapted to cover the opening in said housing connected to said housing and biased to be displaced outwardly therefrom, said plate having slide guides vertically thereof in parallel relation and abutment means at the lower ends of said guides whereby to slidably receive a microfilm cartridge for automatically mounting to said spindle by seating said cover plate to close the opening in said housing.

12. Microfilm viewing apparatus, comprising a housing having a viewer section and a microfilm cartridge receiving section, a take up bobbin in said viewer section having a one way drive, a spindle in said cartridge receiving section having a one way drive and adapted to mount a roll of microfilm, means defining an aperture transversely of said housing, a film guide of a light transmitting nature, said aperture defining means having a light transmitting section mounting said film guide, a reflector means mounted in said aperture defining means for reflecting light through said film guide from opposite sides of said housing, a lens mounted to said housing in viewing relation to said film guide, a coupling leader on said bobbin for extending over said film guide to couple to the microfilm on said spindle, said housing having a separable section opposite said spindle biased to automatically displace outwardly therefrom, means in said housing for releasably locking said separable section thereto, said separable section having means for mounting the roll of microfilm thereto for displacement therewith on release of said locking means.

13. Microfilm viewing apparatus, including a receptacle having a rewind means therein for mounting a cartridge of microfilm, film take up means in said receptacle spaced from said rewind means and having a leader connected to extend for connection to microfilm on said rewind means, film guide means mounted between said rewind and take up means, means mounted to engage film intermediate said guide means and take up means to provide for intermittent advance of said film by the take up means, said receptacle having an extendable cover section, expander bars respectively connecting to said receptacle and said cover section having spring means connected to bias said cover section outwardly from said receptacle, microfilm accommodating means on said cover section between said expander bars for engaging a microfilm cartridge to automatically move it to and from said rewind means, depending on the disposition of said cover section, a latch means for releasably closing said cover section to said receptacle against the bias thereon whereby, on release of said latch means, said cover section is capable of being automatically displaced outwardly from said receptacle, and a lens mounting to said receptacle in viewing relation to said guide means.

14. In combination, a receptacle having a cartridge receiving section and a viewer section, a spindle mounted in said cartridge receiving section, a take up spool mounted in said viewer section, a film guide intermediate said spindle and said spool, a lens mounted to said receptacle in viewing relation to said film guide, a locator means in said cartridge receiving section, a leader connected to said spool extendable over said film guide to be engaged by said locator means in the unloaded condition of the spool, said receptacle having a separable cover element for said cartridge receiving section biased to be displaced outwardly therefrom, a latch means in said receptacle biased for latching engagement with said separable cover element when seated to said receptacle, a microfilm cartridge, a cartridge accommodating means on the inner surface of said separable cover element receiving the microfilm cartridge on outward displacement thereof to automatically position it on said spindle by displacement of said cover element to seat to said receptacle, said spindle and cartridge having cooperable engaging means interengaging on the mounting of the microfilm cartridge to said spindle, the lead end of the microfilm of said cartridge having a coupling element projecting therefrom automatically engaging said leader as the cartridge mounts to said spindle to disengage the locator means thereby.

15. A hermetically sealed microfilm cartridge adapted to serve as a permanent receptacle for a roll of microfilm, comprising a receptacle freely mounting a film spool therein having a roll of microfilm therabout, said receptacle having an aperture aligned with said spool, means keyed for axial movement in said spool biased to normally seal the aperture and frictionally engage to said receptacle to resist rotation of said spool thereby, a film slot in said housing providing the only communication with the film, the lead end of the film being projected through the slot and having a coupling element thereon preventing its withdrawal into said receptacle, and means mounted in said receptacle biased to engage the film and normally seal over the slot to prevent withdrawal of the film.

16. Film viewing apparatus, including a housing having a take up bobbin and a supply spindle therein, said housing having a section thereof opposite said spindle biased for displacement outwardly thereof, film carrier means on the inner surface of said biased section for containing film to automatically mount to said spindle on displacing said biased section from its outwardly biased position to said housing, means for latching said biased section to said housing as it mounts the film on the spindle, means for connecting the film in said housing to said bobbin for take up thereby, a lens mounted to said housing in viewing relation to film passing from said spindle to said bobbin.

17. Film viewing apparatus, including a housing having a take up bobbin and a supply spindle therein, said housing having a section thereof opposite said spindle biased for displacement outwardly thereof, film carrier means on the inner surface of said biased section for containing film to automatically mount to said spindle on displacing said biased section from its outwardly biased position to said housing, means for latching said biased section to said housing as it mounts the film on the spindle, means for connecting the film in said housing to said bobbin for take up thereby, a lens mounted to said housing in viewing relation to film passing from said spindle to said bobbin and means connected to said latch means and operatively related to said take up bobbing whereby to prevent release of said latch means unless the take up bobbin is free of film.

18. In combination, film viewing apparatus, including a housing having a rewind spindle and take up means therein, said housing having a separable cover section opposite said spindle, film carrying means on the inner surface of said separable cover section containing a roll of film in normally sealed relation therein axially aligned with said spindle on connection of said separable cover section to said housing, means in said film carrying means engageable by said spindle to automatically mount the film to said spindle on connection of said separable cover section to said housing, cooperable means in said housing and said film carrying means for breaking the seal of the film in said film carrying means as the roll of film mounts to said spindle and means in said housing for connection to said take up means providing an automatic coupling of said take up means to the film in the film carrying means as the film mounts to said spindle.

19. In combination, film viewing apparatus, including a housing having a rewind spindle and take up means therein, said housing having a separable cover section opposite said spindle, means connecting said cover section to said housing biasing it to be displaced outwardly therefrom, film carrying means on the inner surface of said separable cover section containing a roll of film in normally sealed relation therein axially aligned with said spindle, means in said film carrying means engageable by said spindle to automatically mount the film to said spindle on displacement of said separable cover section to said housing, cooperable means in said housing and said film carrying means for breaking the seal of the film in said film carrying means as the roll of film mounts to said spindle, means in said housing for connection to said take up means providing an automatic coupling of said take up means to the film in the film carrying means as the film mounts to said spindle and latch means automatically locking said cover section to said housing as it is engaged thereto.

20. Film viewing apparatus including a housing having a supply spindle and a take up spool in spaced relation therein, said housing including a separable cover section adapted to mount a roll of film to said spindle on seating thereof to said housing, means automatically latching said separable cover section when sealed to said housing, means for moving the film between said spindle and spool, said take up spool having a notch in its periphery, said automatic latching means including an arm movable to engage in the notch in said spool for release of said cover section, the presence of film on said take up spool preventing said arm from engaging in its notch, thereby to prevent release of said cover section until removal of the film from said take up spool.

21. Film viewing apparatus including a housing having a supply spindle and film take up means therein, said housing including a separable cover section adjacent said spindle biased to separate therefrom, said separable cover section having means connected for mounting a roll of film to said spindle on seating thereof to said housing, means automatically latching said separable cover section on seating thereof to said housing, means for moving film between said spindle and take up means, said automatic latching means having means connected operatively to said take up means preventing release of said separable cover section from said housing until the film therein is completely returned to said supply spindle.

22. Film viewing apparatus including a housing having a take up bobbin and a supply spindle therein, said housing having a section thereof biased for displacement outwardly therefrom, film carrier means connected to said biased section for containing film to automatically mount on said spindle on displacing said biased section from its outwardly biased position to said housing and means for latching said biased section to said housing as it mounts film on the spindle.

23. Film viewing apparatus comprising a housing having film take up means and means for mounting a film supply in spaced relation therein, means connecting opposite sides of said housing defining an aperture transversely therethrough intermediate said mounting means and said take up means, a light transmitting film guide at one portion of said aperture defining means for guiding film from the supply to the take up means, a reflector means adjustably mounted within said aperture defining means for reflecting light through the film guide selectively from opposite sides of said housing and a lens connected to said housing in viewing relation to said film guide.

References Cited in the file of this patent

UNITED STATES PATENTS

| | | |
|---|---|---|
| 1,223,332 | Akeley | Apr. 17, 1917 |
| 1,286,116 | Rousset | Nov. 26, 1918 |
| 1,350,374 | Michalek | Aug. 24, 1920 |
| 1,685,010 | Thornton | Sept. 18, 1928 |
| 1,728,244 | McGarty | Sept. 17, 1929 |
| 1,893,189 | Watts et al. | Jan. 3, 1933 |
| 1,918,468 | Harding | July 18, 1933 |
| 1,940,088 | Harrison | Dec. 19, 1933 |
| 2,106,374 | Goldhammer et al. | Jan. 25, 1938 |
| 2,280,750 | Emerson | Apr. 21, 1942 |
| 2,455,187 | Owens | Nov. 30, 1948 |
| 2,550,556 | Haloski | Apr. 24, 1951 |
| 2,615,772 | Bradley | Oct. 28, 1952 |
| 2,628,526 | Coffey | Feb. 17, 1953 |
| 2,639,957 | Geller | May 26, 1953 |
| 2,721,041 | Nerwin | Oct. 18, 1955 |
| 2,771,825 | Naumann | Nov. 27, 1956 |
| 2,853,923 | Daniel | Sept. 30, 1958 |